March 10, 1936.  S. RUBEN  2,033,482
ELECTRIC CURRENT REGULATOR
Original Filed Jan. 20, 1931  3 Sheets-Sheet 2
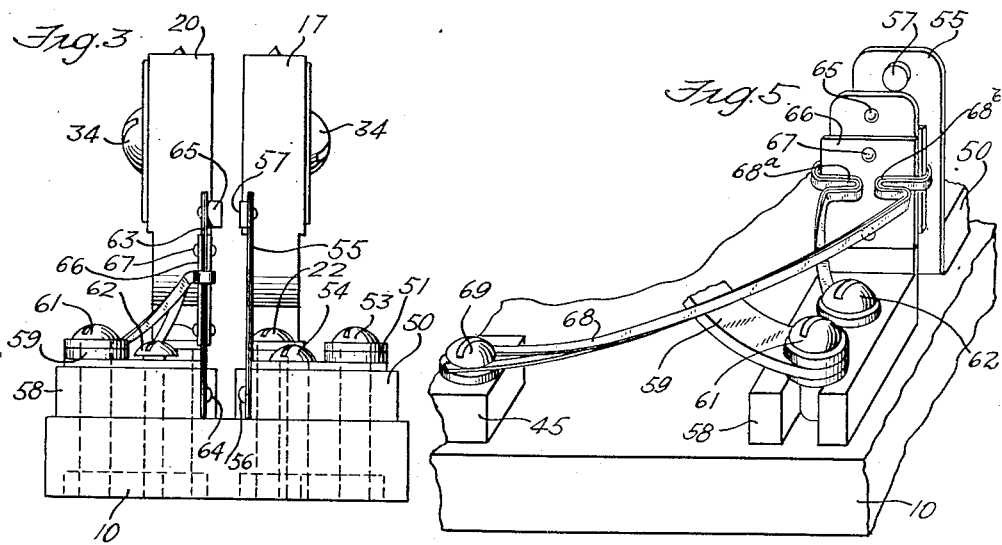
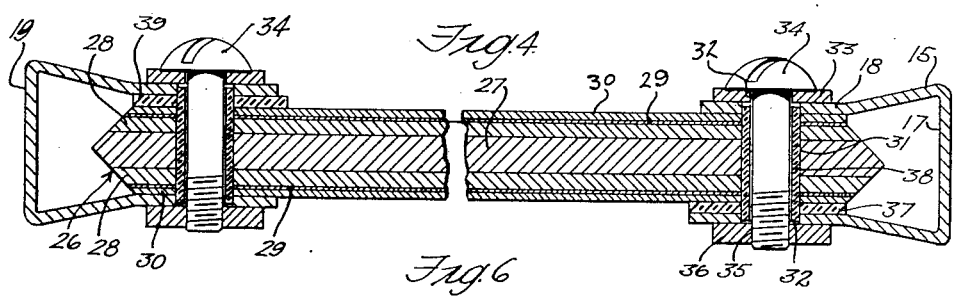
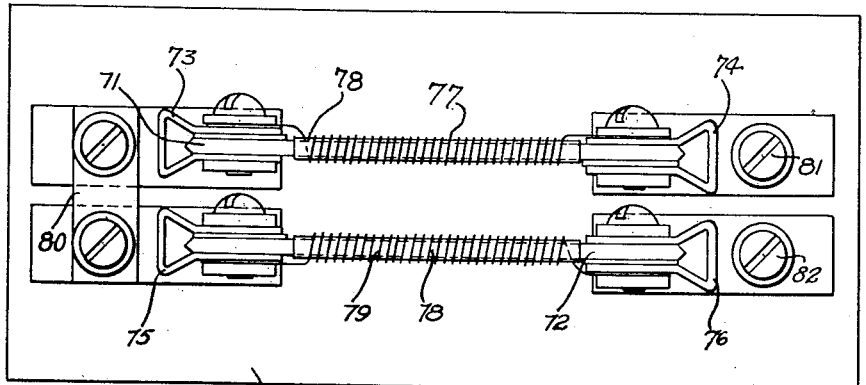

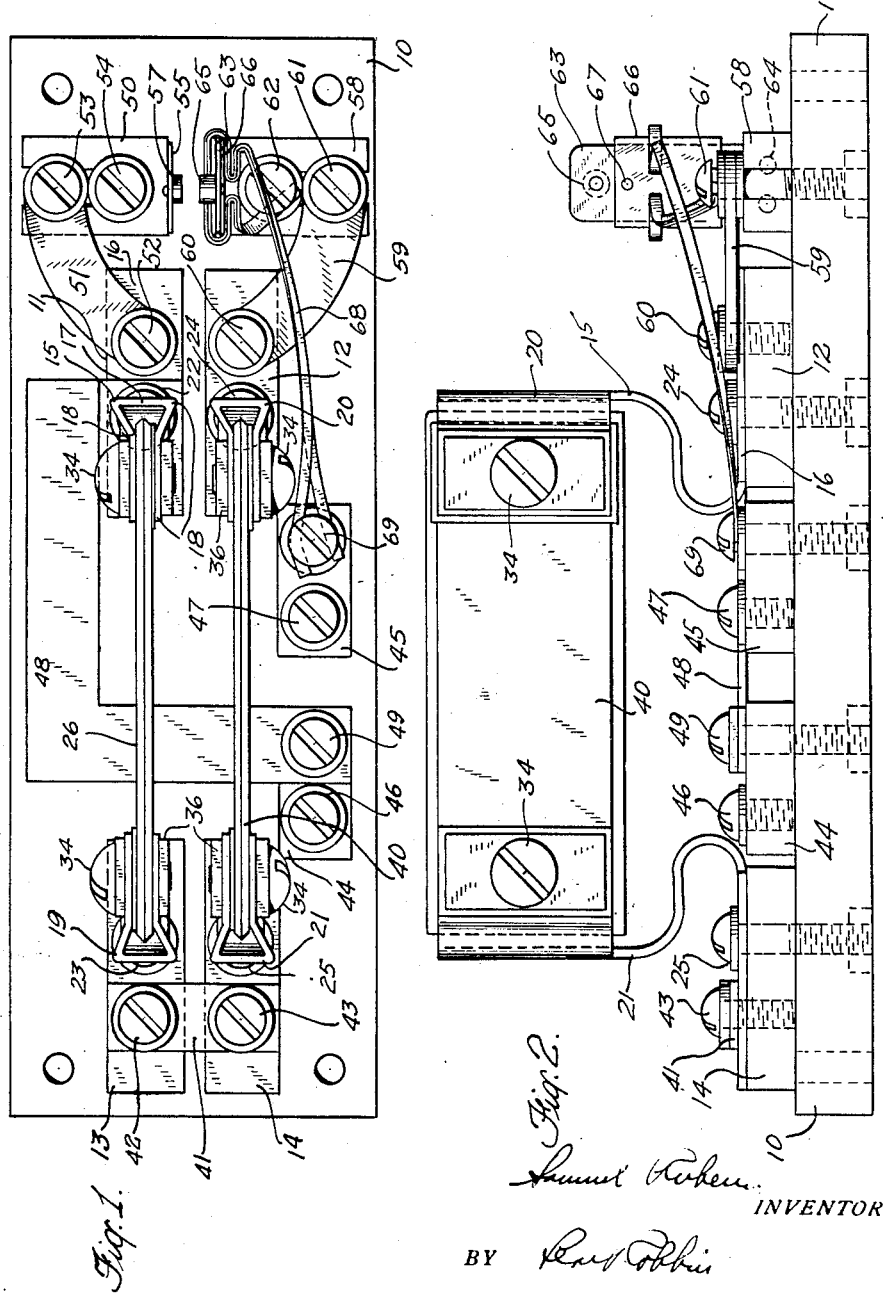

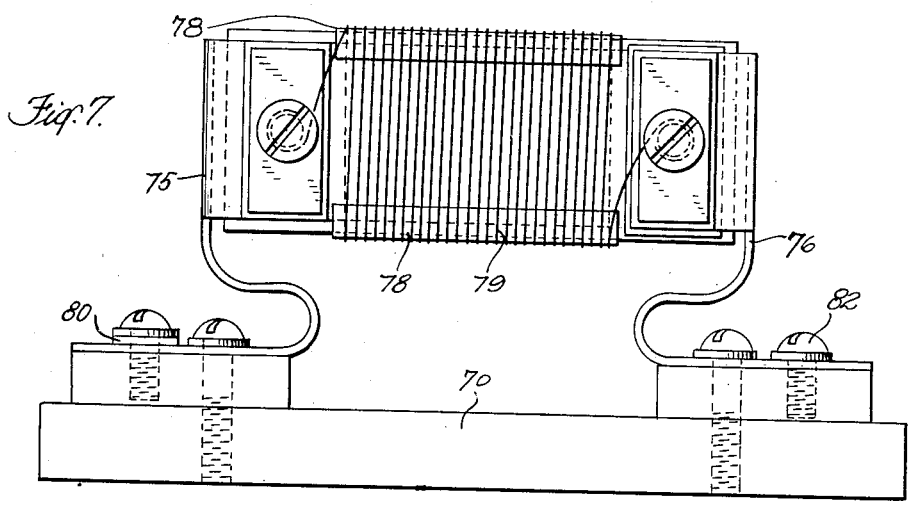
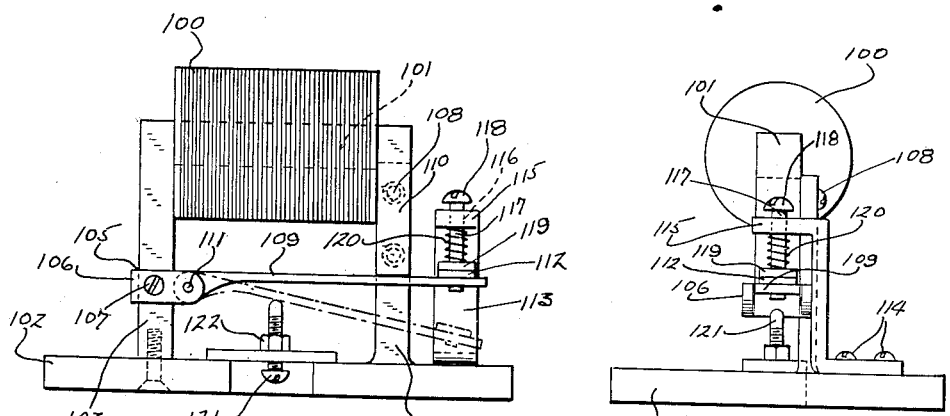

Patented Mar. 10, 1936

2,033,482

UNITED STATES PATENT OFFICE 2,033,482

ELECTRIC CURRENT REGULATOR

Samuel Ruben, New Rochelle, N. Y., assignor to Vega Manufacturing Corporation, Wilmington, Del., a corporation of Delaware Application January 20, 1931, Serial No. 509,925
Renewed July 18, 1935

6 Claims. (Cl. 201—76)

This invention relates to an electrical current control or regulator; specifically to a temperature responsive current control employing the negative resistance coefficient characteristic of cuprous oxide.

The unit is self heated due to the drop of potential thru the resistance layer of cuprous oxide which is integrally formed on the surface of copper.

In order to assist in the obtaining of uniform distribution of current through the oxide layer, I have found it desirable to reduce the surface of the cuprous oxide as by quenching the unit in a hydrocarbon, then silver plating the thin film of copper which is produced by the surface reduction of the cuprous oxide.

I have also found that it is highly desirable in the production of these devices to eliminate as far as possible, the unilateral conductivity in order that the units should be capable of withstanding continuous operation and over-loads. It is believed that the rectifying characteristic is due to the meta-stable layer of copper-cuprous oxide mixture at the junction between the copper and the cuprous oxide and I have found that breakdown of units has been due to the drop of potential across this meta-stable layer; that if this layer is converted to a stable non-asymmetrical conductive one that a lower resistance unit is obtained and one that is heated uniformly over its entire contacting area.

Thus, it is apparent that breakdowns or puncturing of units has been due in most instances to localization of current caused by the inverse potential through the unit when in rectifying condition whereas the desirable voltage drop in a unit should be that due only to the layer of cuprous oxide itself.

By electrically heating the cuprous oxide blanks after the forming of the cuprous oxide on the copper, I have been able to destroy this meta-stable layer and eliminate the asymmetrically conductive effects of the copper-cuprous oxide junction, thereby removing the chief cause of breakdown.

A preferred method of making the units is as follows: Pure copper blanks of the desired dimensions are placed in an oven at a temperature of approximately 1800° Fahrenheit and left there for approximately 15 seconds at the end of which time they are removed and allowed to cool to room temperature. They will be found to have on a dark scale of cupric oxide which may be removed by hand rubbing over the surface or in any other suitable manner. The blanks are then dipped into concentrated nitric acid for about 10 seconds, removed and thoroughly washed in water after which they are dried with a rag or by putting them in sawdust. They are then placed or strung in an oven which has a constant temperature of 1700° Fahrenheit. At the end of 2 hours the temperature of the oven is raised to 1800° Fahrenheit. The effect of this heating is to produce a 10 mil. integrally formed cuprous oxide layer on the copper blanks as described in my co-pending patent application. The oven is then opened and the units removed and immediately quenched in an oil bath at room temperature. The elapsed time between the opening of the oven and quenching should not exceed 2 seconds. After remaining in the oil bath for 3 minutes the units are removed after which they are washed in carbon tetrachloride and then wiped off with a soft cloth and buffed until the entire outer surface is glossy and smooth. The effect of the quenching is to reduce the surface of the oxide to copper, thus allowing the sides of the unit to serve as integral terminals for the oxide. The thickness of the oxide coating itself is dependent upon the temperature of the furnace and length of time the copper is allowed to remain in the furnace.

The units are then given a plated or sprayed protective coating of a metal which does not readily oxidize. Preferably they are silver plated, after which they are washed in cold running water, dried, and the edges filed off.

The next procedure is a second heating or forming which consists in putting the units in an electrical circuit so that initially about one to two amperes is flowing through them and then, over a period of five to ten minutes, gradually increasing the current so that approximately 20 amperes finally flows through.

It will be noted that before this second heat treatment, the resistance of the units at room temperature is approximately 10,000 ohms and that after heating the resistance is approximately 35 ohms. This reduction of resistance is due to the destruction of rectifying effects.

On large capacity units, it is sometimes necessary, in order to avoid undue localization of the current through a small portion of the cuprous oxide, to heat the cuprous oxide by an external means. This is accomplished by having a layer of an insulated resistance wire, preferably one having a high positive temperature coefficient of resistance such as insulated nickel wire, directly wound on the unit and connected in shunt with it. This winding rapidly heats up the cuprous oxide layer to a more conductive condition and prevents localization of current through the oxide.

In order to allow rapid cooling for the next starting I employ a short circuiting device such as a thermostatic element which short circuits the cuprous oxide when it reaches the desired low resistance. The heater element operating this thermostatic element is dependent upon the load current so that the unit remains short circuited until the circuit is interrupted. Magnetic means, as shown in the drawings, may also be used.

The invention has been illustrated in the accompanying drawings in which:

Fig. 1 is a plan view of my novel current control;

Fig. 2 is a side elevational view of the current control;

Fig. 3 is an end view of the current control;

Fig. 4 is a greatly enlarged sectional plan view through one of the units of the current control;

Fig. 5 is a perspective view showing the thermostatic switch and the method of heating it;

Fig. 6 is a plan view of a modified form of the invention;

Fig. 7 is a side elevational view of the embodiment of the invention shown in Fig. 6.

Fig. 8 is a side elevational view of a magnetic switch;

Fig. 9 is an end view of the switch shown in Fig. 8.

Referring now more specifically to the drawings, the construction shown in Fig. 1 comprises a rectangular base (10) formed of any good insulating material which will stand a relatively high temperature such as transite, lava, or the like. In order to support the resistance element upon the insulating base I provide a pair of small blocks 11 and 12 at one end of the base and another pair of blocks 13 and 14 at the other end of the base. These blocks may be formed of metal or heat resisting insulating material as desired and are spaced apart from each other and positioned so that the blocks 11 and 13 are in alignment with each other and the blocks 12 and 14 are also in alignment. Upon the block 11, I position a standard 15. This standard is formed of a strip of sheet metal such as copper having a width corresponding to the width of the block and having a horizontal portion 16 which extends over the upper surface of the block 11 and is provided with a double bend connecting the horizontal portion with a vertical portion 17 having a length sufficient to receive the resistance unit and being spaced from the base as indicated. The vertical portion 17 is provided with a pair of side wings or flanges 18 which are bent at an angle to the vertical portion 17 so as to form two parallel plates between which the resistance unit may be secured. A second standard 19 similar to the standard 15 is mounted upon the block 13 with the side wings aligned with those of the standard 15 and being so positioned as to support the other end of the resistance unit between them. A third standard 20 may be mounted on the block 12 and a fourth standard 21 may be mounted on the block 14. These standards 20 and 21 are exactly similar to the standard 15 and are positioned opposed to each other so as to receive another resistance unit. The standards and blocks are held together and upon the insulating base by bolts which extend through the base and are secured at the lower side by nuts which are positioned in suitable recesses. Thus the standard 15 is secured upon the block 11 by a bolt 22 which extends through a suitable hole in the horizontal portion of the standard and through holes in the block 11 and insulating base 10. The standard 19 is secured upon the block 13 and the block upon the insulating base 10 by means of a bolt 23 which passes through holes in the horizontal portion of the standard, the block 13 and the base 10. In like manner the standard 20 and block 12 are secured together and upon the base by means of the bolt 24 and the standard 21 and block 14 are secured upon the base by means of the bolt 25.

A resistance element 26 is positioned between the two standards 15 and 19 in a manner illustrated in Fig. 4. The element 26 comprises a copper plate 27 which has been treated in the manner described above so that a layer 28 of cuprous oxide is formed upon each surface thereof and upon the surface of the cuprous oxide layer is a thin layer 29 of copper which is silver plated so that the outer surface 30 is of silver, thus providing good conductivity on the surface of the element. A hole 31 through the right hand end of the element is aligned with two holes 32 in the parallel side wings 18 of the standard 15. A metal plate 33 having a suitable hole therethrough which is aligned with the hole through the element is positioned over the outer surface of the side wing at one side and a bolt 34 is passed through the holes in the plate 33, standard 15, and element 26, and is threaded into a hole 35 in a plate 36 provided at the opposite side of the standard. A plate 37 of mica is interposed between the silvered surface on the near side of the resistance unit and the side wing 18 of the standard and an insulating sleeve 38 of heat resisting insulating material such as lava is provided around the bolt 34 where it passes through the resistance element thereby insulating the shank of the bolt from the resistance element. The plate 33 is in contact with both the bolt and the standard and the standard is in contact with the far side of the resistance unit as seen in the figure.

In a similar manner the opposite wing of the unit 26 is secured to the standard 19. In this case however a mica plate 39 is interposed between the silvered surface on the far side of the element and the standard 19 so that the standard 19 is in contact with the silvered surface on the near side of the element. In this manner the standard 19 is electrically connected to the silvered surface on the near side of the element while the standard 15 is electrically connected to the silvered surface on the far side of the element. Thus for current to flow between the standards 19 and 15 it must pass from the standard 19 to the silvered surface on the near side of the resistance unit, through the thin copper layer beneath the silvered surface, through the cuprous oxide layer, through the base metal itself, through the cuprous oxide layer on the far side of the element, to the thin copper layer and the silvered surface of the element, and thence to the side wing of the standard 15.

A resistance element 40 exactly similar to the element 26 is mounted between the standards 20 and 21 in a manner exactly similar to what has already been described so that the standard 21 is in surface contact with the near silver surface of the resistance element 40 while the standard 20 is in surface contact with the far silver surface.

The two standards 19 and 21 are connected together by means of a short bar 41 of copper or brass which may be secured to the blocks 13 and 14 by means of screws 42 and 43 respectively. I also provide two terminals blocks 44 and 45 positioned at one side of insulator base 10 and about midway between the blocks 12 and 14. These terminal blocks may be provided respectively with screws 46 and 47 for attaching wires for connecting the devices in the circuit. The terminal block 44 may be electrically connected to the block 11 by means of a bar 48 formed of sheet metal which may pass under the head of the bolt 22 thereby securing it against the block 11 and under the head of a bolt 49 which may pass through the block 44 and the base 10 to be secured at its lower end by a suitable nut.

The thermostatic switch is mounted at the end of the insulating base 10 beyond the blocks 11 and 12. To this end a block 50 is positioned at the right hand end of the base 10 and toward the further side thereof and connected electrically to the block 11 by means of a connecting arm 51 which is held upon the block 11 by a screw 52 and upon the block 50 by a screw 53 as indicated. The block 50 may be held in place upon the base 10 by means of a bolt 54 which extends through the block and through the base, being held by a nut at the bottom of the plate in a suitable recess. A bi-metallic plate 55 is secured by screws 56 to the end of the block and extends vertically, being provided at its upper end with a contact 57 of silver or tungsten or other suitable metal. Similarly a block 58 is provided on the forward corner of the base and is electrically connected to the block 12 by means of a connecting arm 59 which is connected to the block 12 by the screw 60 and to the block 58 by the screw 61. The block 58 is held upon the base 10 by means of a bolt 62 which passes through the block and the base and is held at the bottom by a suitable nut. Another bi-metallic plate 63 is attached to the further end of the block 58 by means of screws 64 and this plate is also provided with a suitable contact 65 which is spaced from the contact 57 on the bi-metallic plate 55. The plate 63 however is provided at each side thereof with a sheet of mica 66 held in position with suitable rivets 67 and wide enough to extend slightly beyond the sides of the plate 63. This is to permit a heating element to be wrapped around the plate 63 without coming into electrical contact therewith, the mica plates holding the element in spaced relation thereto and preventing any danger of contact.

The element for heating the thermostatic switch is shown more clearly in Fig. 5 and consists preferably of a ribbon 68 of nichrome or other high resistance metal which is doubled over upon itself to form two thicknesses and has its loop end secured under the head of the screw 62. The ribbon then is bent upwardly and is folded over at right angles upon itself and then is curved around the bi-metallic thermostat arm 63 coming close to the mica plates 66. The ribbon 68 then extends in a long curve over to the block 45 and is secured thereupon by means of the screw 69. I provide additional loops 68a and 68b in the resistance ribbon at each end of its bend around the bi-metallic plate 63 so as to insure greater flexibility at this point and prevent the heater ribbon from retarding any movement of the bi-metallic plate as the temperature varies.

With the device constructed as shown it will be apparent that when the two terminal blocks 44 and 45 are connected in a circuit, current will flow through the terminal block 44, the connecting bar 48, the block 11, the standard 15, the further side of the silver coating of the element 26, through the cuprous oxide on the further side of the element, through the copper base of the element, through the cuprous oxide surface on the near side of the element on to the silver coating on the near side through the standard 19, the block 13, the connecting arm 41, the block 14, the bracket 21, the silver coating on the near side of the element 40, the cuprous oxide coating on the near side of the element, the core of the element itself, the cuprous oxide surface on the other side of the element, on to the silver surface on the far side of the element, through the standard 20, the block 12, through the arm 59, the block 58, through the resistance element 68, and out through the block 45. As the resistance of the elements 26 and 40 is very high when they are cold the initial current for starting a motor, for instance, is greatly reduced but as this current flows through the resistance ribbon 68 it raises the temperature thereof sufficient to heat the bimetallic thermostat plate 63 around which the heater ribbon is wrapped and causes it to bend toward the other plate so that the contact 65 approaches the contact 57. After the motor has started the current immediately drops but at about this time the temperature of the thermostat is sufficient to cause the contacts to touch each other thereupon short-circuiting the resistance elements 26 and 40 and causing the reduced current to flow through the resistance ribbon only while the motor is running.

A feature of the invention is the means for keeping the contacts 65 and 57 together after the motor has started and the current is reduced. It will be seen that after the contacts have come together and the current is reduced the tendency is for the bi-metallic plate 63 to cool off slightly so that it would move away from the other plate and break the connection again if the other contact 57 were fixed in position. However during this time the bi-metallic plate 55 is absorbing heat by radiation from the part of the resistance ribbon passing between the two plates and from the plate 63. Accordingly when the temperature of the plate 63 has been lowered sufficiently to cause the plate to move the contact 65 in a direction away from the contact 57 the plate 55 has absorbed enough heat to cause it to bend toward the plate 63 so that the contact 57 follows the contact 65 and does not separate from it. Thereafter the heat from the resistance wire or ribbon is sufficient to maintain both the plates 63 and 55 bent toward each other and the contacts 65 and 57 touching each other.

In order to be able to start the motor and stop it in rapid succession it is desirable that the whole device will cool down quickly enough after the current is turned off so that it will be ready to assume the load when the current is turned on again. Accordingly I preferably make all of the parts with as little mass as possible and with as large radiating surface as possible.

Note should be made of the fact that the standards 15, 19, 20 and 21 are flat strips and are provided with double curves which permits a slight expansion or contraction of the resistance elements 26 and 40 with the temperature changes without putting an undue strain upon the parts. While the standards are not necessarily limited to the construction shown it is preferable that some means be provided to give the upper ends thereof more or less free movement within a limited range.

In attaching the units 26 and 40 in the brackets it is preferable to have the side brackets make a uniform contact with the silver surface of the element. I therefore prefer to slightly bend or distort the plates 33 and 36 so that the side edges of these plates will bear against the side wings of the brackets with as much force as at the center where the bolt passes through. By providing the slight bends in these plates they are always under a tension and hold the resistance unit securely with a uniform surface contact.

In Figs. 6 and 7 a modified form of the invention is shown in which the thermostat switch is omitted, the current flowing through the device at all times during the operation of the motor or other device in which the surge arrester is used. In this construction the base 70, similar to the base 10 already described, has supported upon it a pair of resistance elements 71 and 72, the element 71 being mounted between standards 73 and 74. The mounting of these resistance elements is exactly the same as is shown and described in connection with the elements 26 and 40 of the previous figures. The element 71 however has a coil 77 of resistance wire such as nickel, nichrome, or the like having a positive temperature coefficient of resistance surrounding it and connected at the ends thereof to the standards 74 and 73. Strips of insulating material 78 are provided over the edges of the element 71 so as to prevent the wire from touching the surface of the resistance element. In like manner the resistance element 72 has a coil 79 of resistance wire wound around it with the ends thereof connected to standards 75 and 76 and this coil is also provided with a strip 78 of mica which prevents contact between the resistance wire and the resistance element itself. A connecting bar 80 is provided connecting the two standards 73 and 75 while the device is connected in a circuit by means of the terminal screws 81 and 82 which are connected to the standards 74 and 76 respectively. It will be noted from this arrangement that the resistance elements are in series with each other and the resistance coil in each case is in shunt with the resistance element. In this manner the resistance wire may be made to carry a large portion of current.

In Figs. 8 and 9 a modified form of the short circuiting switch is shown. Here a magnet coil 100 wound around an iron core 101 is supported upon a baseboard 102 of non-magnetic material by means of suitable brackets 103 and 104. The bracket 103 may be made integral if desired with the core 101 of the magnet and is preferably offset at 105 to receive a hinge connection 106 which may be secured to the bracket 103 by means of the screw 107. The other supporting bracket 104 may be attached to one side of the core 101 by means of the screws 108 and is preferably made of non-magnetic material. That end of the core 101 is extended downwardly to a point approximately opposite to the hinge connection 106 and forms a stop for the armature 109 which is pivoted to the hinge connection 106 by means of the pivot 111 and extends beyond the core end 110, being provided at its end with a contact 112. A bracket 113 is provided adjacent the armature 109 and spaced slightly to one side thereof and may be secured upon the base plate 102 by means of the screws 114. This bracket has its upper end 115 bent over the contact and is provided with a hole 116 through which a pin 117 may slightly pass. The pin 117 is provided with a head 118 to prevent it passing downwardly through the end 115 of the bracket 113. The lower end of the pin 117 is provided with a contact 119 which is urged downwardly by a spring 120 which surrounds the pin 117 and bears against the upper side of the contact 119 and the lower side of the bracket 115. This construction insures the contact 119 being normally at its lowermost position and permits it to move upwardly against the tension of the spring 120. A suitable adjusting screw 121 provided with lock-nut 122 is provided to regulate the lower position of the armature 109 which assumes that lowermost position by the force of gravity or a suitable spring may be provided to urge it to its lowermost position when the magnet is not energized.

This short-circuiting switch may be used in place of the thermostatic switch shown in Figs. 1 to 5 inclusive and necessitates the maximum current permitted by the resistance element before enough magnet flux is produced to draw the armature up and make the contact and thereby short circuit the resistance unit. After the contact has been made however a materially reduced current which is the normal current when the motor or other apparatus is in operation is sufficient to hold the armature in position with the contact closed. This type of magnetic switch has the advantage that it does not have to cool off after the current is turned off, so that for motors or other appliances which need to be intermittently operated the magnetic type of switch is preferred.

While I have shown a specific type of magnetic switch it will be understood that other types may be used such as one with a dash pot for retarded operation on a small amount of current. Other types of switches may be used and in some cases it may even be preferred to use a manually operated switch to be closed when the motor has come up to speed.

Many modifications of the invention may be resorted to without departing from the spirit of the claims and I do not, therefore, desire to limit myself to what has been shown and described except as such limitations occur in the appended claims.

What I desire to claim is:

1. In a current control, a pair of standards, a resistance element mounted between said standards and comprising a metal plate, a coating of compound of copper having a negative temperature coefficient of resistance on each side of said plate, a metal coating on each of said copper compound coatings, a pair of spaced apart plates on each of said standards, said plates being adapted to squeeze the ends of said resistance element between them, and means to insulate one side of said resistance element from one of said standards, and means to insulate the other side of said resistance element from the other standard.

2. The method of removing the rectifying characteristics of a copper cuprous oxide resistor for a current regulator which comprises the step of passing a current of about 1 ampere through the junction surfaces of the resistor and gradually increasing the current over a period in the neighborhood of ten minutes until approximately 20 amperes of current is flowing.

3. A current control comprising a metal base having an integral layer of fused cuprous oxide, the junction surface of said metal base and cuprous oxide being substantially free from electrical rectifying action.

4. A current control comprising a copper base having an integral layer of fused cuprous oxide, the junction surface of said copper base and cuprous oxide being substantially free from electrical rectifying action.

5. The method of removing the rectifying characteristics of a copper-cuprous oxide resistor for a current regulator which comprises gradually heating the junction surfaces between the copper and the cuprous oxide from room temperature up to a temperature sufficient to bring about the homogeneous and stable form of cuprous oxide adjacent the copper surface, while simultaneously passing an electric current across said junction.

6. A step in the method of removing the rectifying characteristics of a copper-cuprous oxide resistor for a current regulator which comprises gradually heating the junction surface between a copper plate and an integral layer of cuprous oxide formed on said plate from approximate room temperature up to a temperature point at which the cuprous oxide assumes a homogeneous and stable form permitting a symmetrical flow of current in either direction across the junction between the copper and cuprous oxide surfaces.

SAMUEL RUBEN.